United States Patent Office.

GEORGE BRICKER, SEN., OF NEWVILLE, PENNSYLVANIA, ASSIGNOR TO HIMSELF AND S. I. IRVIN, OF SAME PLACE.

Letters Patent No. 60,679, dated January 1, 1867.

IMPROVED FURNITURE POLISH AND RESTORER.

The Schedule referred to in these Letters Patent and making part of the same.

TO ALL WHOM IT MAY CONCERN:

Be it known that I, GEORGE BRICKER, sr., of Newville, in the county of Cumberland, and State of Pennsylvania, have invented a new and Improved Furniture Polish and Restorer; and I do hereby declare the following to be a full, clear, and exact description of the same, sufficient to enable one skilled in the art to which the invention appertains to make use of it.

This compound is intended to be used as a furniture polish, or to be rubbed over previously polished furniture to restore its gloss. It consists of a compound of alcohol, gum sandarach, shellac, or other suitable gum, and prepared gall.

The gall is viscid and alkaline, and acts as an efficient substitute for oil in the compound. The alcoholic solution of gum would stick and refuse to slip upon the wood, and the varnish requires some emollient material.

Linseed oil is commonly used in combination with the alcohol and gum in this connection. but it leaves a omewhat dead surface upon the wood, derived from its emulsive character, and after the evaporation of the pirit the surface is more easily smeared, owing to the presence of the oil.

The gum makes a much better surface without the oil. The latter assists in the manipulation and the flow of the varnish, but leaves a greasy finish. The gall, owing to its viscid quality, answers the same purpose as the oil, without the subsequent injurious effects, its alkaline nature fitting it for intimate combination with the other ingredients, and also enabling the varnish thus prepared to be flowed more evenly over the surface of furniture which may be somewhat greasy or at least soiled by contact in the various uses of a household.

The proportions and mode of compounding are about as follows: to three fluid ounces of alcohol, (as near absolute as possible; what is commonly known as ninety-five per cent. alcohol,) add two-thirds of an ounce of gum sandarach, gum shellac, or other suitable gum. To this alcoholic solution of gum add one-third of an ounce of a solution of prepared gall. This solution of gall consists of one part gall and two parts alcohol, so that the complete compound is about as follows: alcohol, $3\frac{2}{3}$ fluid ounces; gall, $\frac{1}{3}$ of an ounce; gum, $\frac{2}{3}$ of an ounce. These proportions may be somewhat varied. I prefer gum sandarach, but some other gums, such as shellac, will answer a good purpose.

The polish is applied by taking a piece of woollen cloth covered with a single thickness of muslin, which is wetted with the solution and applied to the furniture.

What I claim as new, and desire to secure by Letters Patent, is—

A furniture polish or polish restorer compounded of an alcoholic solution of gum and gall, substantially as described.

To the above specification of my improved furniture polish and restorer I have signed my hand this 12th of December, 1866.

GEO. BRICKER, SR.

Witnesses:
 EDWARD H. KNIGHT,
 SOLON C. KEMON.